May 7, 1957  S. G. HOOKER  2,791,090
IMPROVED COOLING AND LUBRICATING ARRANGEMENT
FOR BEARINGS OF A GAS TURBINE ENGINE
Filed July 27, 1953  2 Sheets-Sheet 1
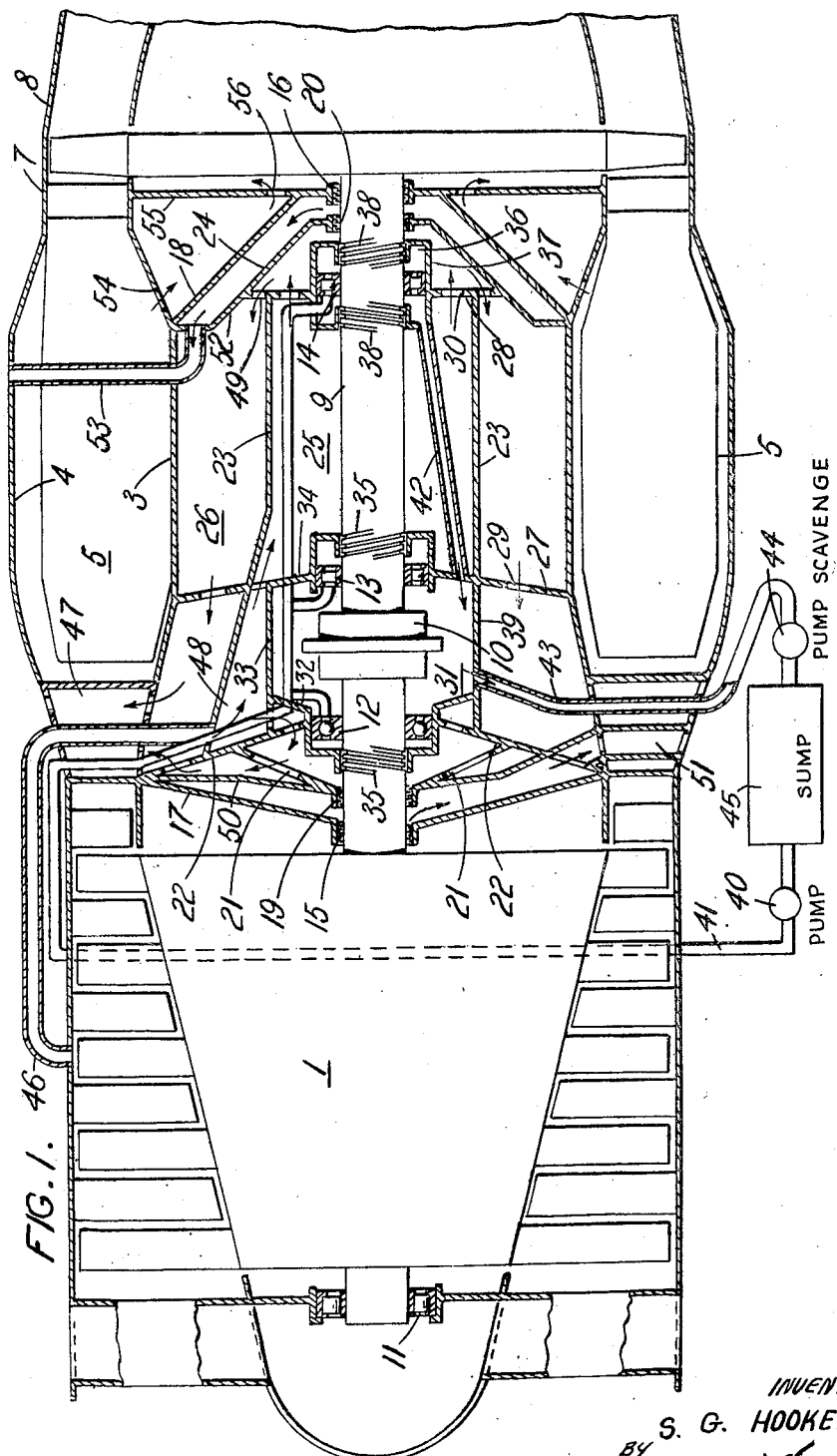
INVENTOR
S. G. HOOKER
BY
Wilkinson & Mawhinney
ATTYS May 7, 1957 S. G. HOOKER 2,791,090
IMPROVED COOLING AND LUBRICATING ARRANGEMENT
FOR BEARINGS OF A GAS TURBINE ENGINE
Filed July 27, 1953 2 Sheets-Sheet 2
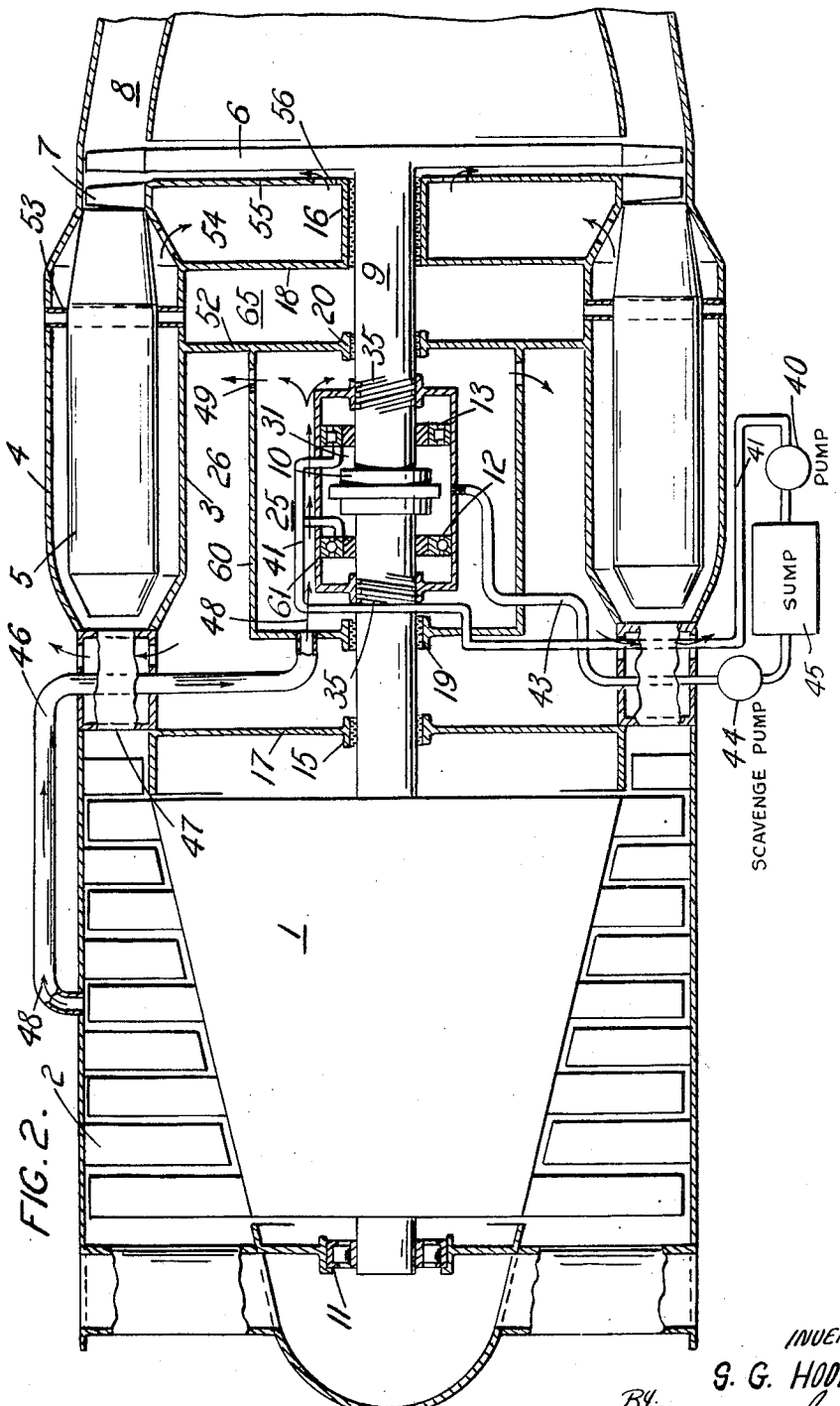
INVENTOR
S. G. HOOKER
BY:-
Wilkinson & Hawkins
ATTYS.

United States Patent Office 2,791,090
Patented May 7, 1957

2,791,090

IMPROVED COOLING AND LUBRICATING ARRANGEMENT FOR BEARINGS OF A GAS TURBINE ENGINE

Stanley George Hooker, Falfield, England, assignor to The Bristol Aeroplane Company Limited, Bristol, England, a British company Application July 27, 1953, Serial No. 370,467

Claims priority, application Great Britain August 5, 1952

8 Claims. (Cl. 60—39.08)

This invention relates to gas turbine engines of the kind comprising in axial sequence a compressor, combustion equipment housed between inner and outer air casings, and a turbine, the rotors of the compressor and turbine being interconnected by shafting journalled in bearings within said inner air casing.

Great difficulty has been experienced in the past in keeping these bearings sufficiently cool and well lubricated to avoid rapid deterioration, and in keeping oil from contact with the hot inner air casing, where it is apt to become ignited, or at least carbonised with the formation of smoke.

The object of the present invention is to provide an improved gas turbine engine, the improvement being directed to the arrangement of sealing means, ventilation and lubrication for the bearings referred to in the preceding paragraph with a view to overcoming the difficulties mentioned above.

According to the present invention, a gas turbine engine of the kind referred to above further comprises a labyrinth or equivalent seal around the shafting between the compressor rotor and the bearing adjacent thereto, and around the shafting between the turbine rotor and the bearing adjacent thereto, first partition means extending from the stationary member of each of said seals to the inner air casing, second partition means extending between the stationary members of second labyrinth or equivalent seals arranged around said shafting between said first mentioned seals and the bearings adjacent thereto, said second partition means being spaced from said inner air casing to form inner and outer chambers in said casing, third partition means in sealing relation with said shaft and forming within said inner chamber and spaced from said second labyrinth seals one or more innermost chambers containing said bearings, means for supplying liquid lubricant to said innermost chamber or chambers to flood said bearings, a lubricant scavenging system having conduit means in communication with said innermost chamber or chambers, means for supplying air at a temperature lower than the temperature of the air discharged from said compressor and at a pressure higher than the lubricant in said innermost chamber or chambers to said inner chamber, and means for venting said outer chamber to the ambient atmosphere.

In a preferred arrangement according to the present invention the gas turbine engine still further comprises fourth partition means extending from the inner air casing to one or both of the stationary members of said second labyrinth or equivalent seals, or to said second partition means, means for venting the chamber or for separately venting the chambers, formed between said first and fourth partition means to ambient atmosphere, and openings in said second partition means arranged to ensure, in co-operation with said air supply means and the first said venting means, air flow through substantially all parts of said inner and outer chambers when said air supply means is operating.

Two embodiments of the present invention will now be described, by way of example, one with reference to Figure 1 of the accompanying drawings, which shows diagrammatically in section a gas turbine engine according to the present invention, and one with reference to Figure 2 of the accompanying drawings which is also a purely diagrammatical illustration of a section of a gas turbine engine in accordance with the present invention.

Referring first to Figure 2, the engine comprises a compressor having a rotor 1 and a stator 2, followed by combustion equipment comprising an inner air casing 3, an outer air casing 4 and a number of separate flame tubes 5 spaced apart circumferentially in the space between the air casings. From the combustion system the motive fluid passes to a turbine represented by a rotor 6 and a stator 7 and is then discharged through an exhaust duct and jet pipe partly shown at 8. The compressor and turbine rotors are connected by a shaft 9, including a coupling 10, which may be of the spherical type allowing slight misalignment.

The compressor rotor is supported at its forward end by a bearing 11 and in the space within the inner air casing there are further bearings 12, 13, one on each side of the coupling 10. A labyrinth or equivalent seal 15 is provided around the shaft 9 between the compressor rotor 1 and the bearing 12 which is adjacent thereto, and similarly a seal 16 is provided between the turbine rotor 6 and the bearing 13. From the stationary member of the seal 15 a partition 17 extends to the inner air casing 3, and a similar partition 18 extends from the stationary member of the seal 16 to the air casing 3.

Between the seal 15 and the adjacent bearing 12 a further seal 19 is provided and similarly a further seal 20 is arranged between the seal 16 and the bearing 13. From the stationary member of the seal 19 a partition 60 extends to the stationary member of the seal 20. The partition 60 is spaced from the inner air casing 3 so that the partition divides the space within the casing 3 and between the first-mentioned partitions 17 and 18 into an inner chamber 25 and an outer chamber 26. Where necessary, structure diaphragms (not shown) may cross the chambers 25, 26 to support internal parts.

The bearings 12 and 13 are housed within an innermost chamber 31 which is divided off from the inner chamber 25 by partition 61 and is closed at its ends by sealing means including oil-return threads 35. It will be noted that the innermost chamber 31 is spaced from seals 19, 20, that is from the ends of the inner chamber 25.

Lubricating oil is supplied to the bearings 12, 13, to flood the bearings, by a pump 40 through a system of conduits 41. The oil from the bearings 12 and 13 is removed through a pipe 43 by a scavenge pump 44 and returned to a sump 45.

The inner and outer chambers 25, 26 are ventilated by air supplied at a temperature lower than that of the air discharged from the compressor and at a pressure higher than that in the innermost chamber 31, so that air tends to leak into the innermost chamber 31 and to prevent the escape of oil therefrom, such leakage air being extracted by the scavenge system. As shown in Figure 2 the ventilation air is preferably bled from an intermediate stage of the compressor and led by a conduit 46 passing through a hollow aerofoil section supporting vane 47 into the chamber 25 as indicated by the arrow 48. This air passes through suitably arranged openings such as 49 in the partition 60 into the outer chamber 26 and is vented through the hollow vane 47.

A further partition 52 is provided extending from the inner air casing 3 to the partition 60, and the space 65 between the partitions 52 and 18 is separately vented to ambient atmosphere by a conduit 53 passing outwardly between two of the flame tubes 5. In this way hot gases from the turbine leaking past the seal 16 are kept separate from the cooler ventilating air passing over the innermost chamber 31 containing the bearings 12 and 13.

Gas from around the flame tubes 5 which, while substantially cooler than the main gas stream through the turbine blading is still too hot to be allowed into proximity with the bearings 12, 13, is admitted through openings 54 in the air casing 3 in the rear of the partition 18 and is caused to flow radially outwardly over the surface of the turbine rotor 6 by the partition 55 having openings 56 through which the gas flows into the space between the partition and the rotor. Hot gas leaking from this space past the seal 16 is separately vented through the conduit 53 so that it does not mix with the ventilation air passing through the chambers 25 and 26 or come in contact with the walls of the innermost chamber 31 containing the bearings 12 and 13.

In Figure 1 of the drawings, which shows a more practical, yet nevertheless, diagrammatic layout for a gas turbine engine, parts corresponding to parts already described with reference to Figure 2 are indicated by the same reference numerals. In this case, the shaft 9 is supported on three bearings 12, 13 and 14 within the inner air casing 3, the bearings 12 and 13 being contained in an innermost chamber 31 as before, and the bearing 14 in another innermost chamber 36.

The partition 60 of Figure 2 extending from the seal 19 to the seal 20 is in the present case made up of a system of partitions comprising the parts 21, 22, 23 and 24, and the chambers 25, 26 are crossed by structural diaphragms such as 27, 28 formed with openings such as 29 and 30 to provide communications between the divided parts of the chambers.

The innermost chamber 31 is divided off from the inner chamber 25 by partitions 32, 33 and 34, and the innermost chamber 36 is divided off from the inner chamber 25 by a partition 37 and sealing means including oil return threads 38. As with the innermost chamber 31, the innermost chamber 36 is spaced from the seal 20, that is from the adjacent end of the inner chamber 25.

Whilst, in general, it is preferred that the walls of the innermost chambers should be everywhere spaced from those of the inner chamber, it may be convenient, in certain positions, that an innermost chamber extend outwardly to the wall of the inner chamber. An example of this is illustrated at 39 in Figure 1, where the innermost chamber 31 is bounded in part by the partition 23 which forms part of the wall of the inner chamber 25.

In the example now being described the pump 40 supplies lubricating oil to all the bearings 12, 13, 14 through a system of conduits 41. Oil from the innermost chamber 36 is drained to the innermost chamber 31 through a pipe 42, oil being removed from the innermost chamber 31 by the scavenge pump 44 as before. If desired, oil from each bearing may be withdrawn by a separate scavenge pump, additional partitions being provided in the chamber 31 so that oil is restrained from discharging into the main body of the chamber.

The ventilating air supplied to the inner chamber 25 through the conduit 46 tends to leak into the innermost chamber 36 as likewise into chamber 31 and oil is thereby prevented from escaping from these chambers. In the present arrangement, of the ventilating air entering the chamber 25, part passes through openings such as 49 in the structural diaphragm 28 into the outer chamber 26, while another part passes through openings in the partitions 21 and 22. Air from the chamber 26 is vented through the hollow vane 47 to ambient atmosphere.

As shown in Figure 1, with a similar purpose as partition 52 which has previously been described with reference to Figure 2, a further partition 50 is provided extending from the partition part 21 adjacent the stationary member of the seal 19 to the casing 3, and the space between the partition 50, and the partition 17 is separately vented to ambient atmosphere by a conduit 51 passing through a hollow aerofoil vane. In this way air from the compressor discharge leaking past the seal 15 is kept separate from the cooler ventilating air passing over the innermost chamber 31. The partition 52 in the present instance extends from the casing 3 to the partition 24, and the space between the partitions 52, 24 and 18 is vented to ambient atmosphere by the conduit 53 previously described. The partition 52 thus prevents hot gases from the turbine leaking past the seal 16 separate from the cooler ventilating air passing over the innermost chamber 36.

While the invention has been described as applied to a gas turbine comprising only one rotating system, it is equally applicable to compound types in which one or more inner shafts extend through the shaft 9 to couple compressors and turbines arranged respectively before the compressor 1 and after the turbine 6. It should also be understood that in known manner the seals may be arranged at different diameters if desired, and the moving seal surface may in some cases be carried by a rotor rather than directly by the shaft proper.

I claim:

1. A gas turbine engine comprising a compressor having a rotor, combustion equipment, a turbine having a rotor, the compressor, combustion equipment and turbine being arranged in axial sequence, inner and outer air casings forming an annular passage which houses the combustion equipment, shafting extending through the inner air casing and connecting the compressor rotor to the turbine rotor, bearings within said inner air casing, in which bearings said shafting is journalled, a first pair of seals, one around the shafting between the compressor rotor and the bearing adjacent thereto and the other around the shafting between the turbine rotor and the bearing adjacent thereto, said seals each having a stationary member, first partition means extending from the stationary member of each of said first pair of seals to the inner air casing, a second pair of seals, one around the shafting between one of the seals of said first pair of seals and the bearing adjacent thereto and the other round the shafting between the other of the seals of the first pair of seals and the bearing adjacent thereto, said second pair of seals each having a stationary member, second partition means extending between the stationary members of said second pair of seals, said second partition means being spaced from said inner air casing to form inner and outer chambers in said casing, third partition means in sealing relation with said shafting and forming within said inner chamber and spaced from said second pair of seals at least one innermost chamber containing at least one of said bearings, means for supplying liquid lubricant to said innermost chamber to flood said bearing, means for supplying air at a temperature lower than the temperature of the air discharged from said compressor and at a pressure higher than the lubricant in said innermost chamber to said inner and outer chambers including openings connecting said inner and outer chambers, and means for venting said outer chamber to the ambient atmosphere.

2. A gas turbine engine as claimed in claim 1 further comprising fourth partition means extending from the inner air casing to said second partition means to divide the outer chamber into two parts, means for venting these parts to ambient atmosphere, and said openings being formed in said second partition means and arranged to insure, in cooperation with said air supply means and the first said venting means, air flow through substantially all parts of said inner chamber and at least one part of said parts of the outer chamber when said air supply means is operating.

3. A gas turbine engine as claimed in claim 2, wherein said combustion equipment includes a plurality of flame tubes spaced apart circumferentially between said inner and outer air casings and said engine further comprises fifth partition means extending from the inner air casing to the stationary member of the seal of said first pair of seals adjacent the turbine rotor, said fifth partition means defining with said first partition means connected to the stationary member of said seal a space on the side of said first partition means adjacent the turbine rotor, said inner air casing having openings communicating the zone around said flame tubes adjacent said inner air casing with the space between said first and fifth partition means, these openings permitting the relatively cool gas from said zone to flow into said space, and said fifth partition means having openings to permit gas from said space to flow radially outwardly over the upstream face of said turbine rotor.

4. A gas turbine engine as claimed in claim 1 further comprising sealing means between said third partition means and said shafting, said sealing means including oil return threads.

5. A gas turbine engine as claimed in claim 1 wherein said shafting has a coupling within said inner air casing, and three bearings are provided, one on one side of said coupling, and two on the other side of said coupling, and wherein two of said innermost chambers are provided one containing the coupling and the bearing next adjacent each side thereof, and the other containing the remaining bearing.

6. A gas turbine engine as claimed in claim 5 wherein one at least of said innermost chambers is bounded in part by the wall of said inner chamber.

7. A gas turbine engine as claimed in claim 6 wherein the innermost chamber containing said coupling extends outwardly to, and is bounded by the wall of, said inner chamber below said shafting.

8. A gas turbine engine as claimed in claim 7 wherein lubricant supplied to the innermost chamber containing the single bearing only is drained to the innermost chamber containing said coupling, and said lubricant scavenging system, includes a scavenge pump connected to the innermost chamber containing the coupling to withdraw lubricant therefrom and return it to a sump.

References Cited in the file of this patent

UNITED STATES PATENTS

| | | |
|---|---|---|
| 2,173,489 | Voigt | Sept. 19, 1939 |
| 2,487,842 | Whiteman et al. | Nov. 15, 1949 |
| 2,531,411 | Davenport | Nov. 28, 1950 |
| 2,578,481 | Lombard | Dec. 11, 1951 |
| 2,584,899 | McLeod | Feb. 5, 1952 |
| 2,613,498 | Prendergast | Oct. 14, 1952 |
| 2,614,386 | McLeod | Oct. 21, 1952 |
| 2,625,794 | Williams et al. | Jan. 20, 1953 |

FOREIGN PATENTS

| | | |
|---|---|---|
| 622,181 | Great Britain | Apr. 27, 1949 |
| 963,245 | France | Dec. 26, 1949 |